United States Patent [19]
Chen

[11] Patent Number: 5,729,577
[45] Date of Patent: Mar. 17, 1998

[54] SIGNAL PROCESSOR WITH IMPROVED EFFICIENCY

[75] Inventor: Weizhong Chen, Keller, Tex.

[73] Assignee: Motorola, Inc., Schaumburg, Ill.

[21] Appl. No.: 646,804

[22] Filed: May 21, 1996

[51] Int. Cl.$^6$ .............................. H03D 3/00; H04L 27/14
[52] U.S. Cl. ..................... 375/334; 375/349; 370/210; 329/300
[58] Field of Search ..................... 375/272, 334, 375/342, 349; 329/300; 370/210; 455/205

[56] References Cited

U.S. PATENT DOCUMENTS

| | | | |
|---|---|---|---|
| 4,554,509 | 11/1985 | Cornett | 375/324 |
| 5,025,443 | 6/1991 | Gupta | 375/290 |
| 5,469,469 | 11/1995 | Haines | 375/201 |
| 5,535,240 | 7/1996 | Carney et al. | 375/219 |

OTHER PUBLICATIONS

Oppenheim, Alan V. and Schafer, Ronald W., "Discrete-Time Signal Processing,"Prentice Hall, Englewood Cliffs, NJ, 1989.

Primary Examiner—Don N. Vo
Attorney, Agent, or Firm—Charles W. Bethards

[57] ABSTRACT

A signal processor arranged and constructed to provide a discrete time Fourier transform (DTFT) corresponding to a sequence of samples, including a current, preferably, last sample, of a signal, the signal processor including a recursive structure (303), coupled to the signal and operating on the sequence of samples, for providing an output (309) and a first previous output (310), the output proportional to a combination of the current sample of the signal, and the first previous output weighted by a sinusoidal function, less a second previous output (316), the sinusoidal function having an argument corresponding to an arbitrary frequency, and a combiner (330) coupled to the output and the first previous output for providing a DTFT signal proportional to a DTFT evaluated at the arbitrary frequency for the sequence of samples.

17 Claims, 5 Drawing Sheets

5,729,577

SIGNAL PROCESSOR WITH IMPROVED EFFICIENCY

FIELD OF THE INVENTION

The instant invention deals with signal processors and more particularly such processors having improved efficiency or accuracy.

BACKGROUND OF THE INVENTION

Generally signal processors are well known and widely used particularly in wireless communications systems such as certain selective messaging systems. Many current selective message systems employ digital modulation techniques to facilitate conveyance of information over the communication media or channel. This together with more capable digital signal processors (DSPs) have popularized various digital processing techniques now used by practitioners to perform various system sub-functions associated with receiving or transmitting information.

One system function typically required in a selective messaging receiver is symbol recovery. Often practitioners resort to sampled data receivers where the incoming signal is digitized and thereafter using DSPs digitally processed to eventually yield a detected symbol. This digital processing may well use some form of Fourier Transform or more specifically some form of Fourier transform suitable for sampled data. Such Fourier transforms include a discrete time Fourier transform (DTFT) that exists for any frequencies less that the sampling frequency and the discrete Fourier transform (DFT) which exists only at N discrete equally spaced frequencies where N is the number of samples used to determine the DFT. A fast Fourier transform (FFT) is a fast or efficient algorithm for finding a DFT.

Various relatively well known approaches exist to determine the DTFT or DFT. Which transform is needed will depend on the requisites for the transform. For example to find a Fourier transform at an arbitrary frequency requires a DTFT as it is the only one of the above transforms that exists for all frequencies. This is unfortunate as the DTFT approaches in use are relatively calculation intensive and therefore may require relatively capable DSPs or the like. This capability entails significant disadvantages such as processor costs or calculation time and power consumption which may be an issue in portable receiver applications. Further known approaches for determining a DTFT may require a processor with extended dynamic range further exasperating the economic burdens. Clearly a need exists for a signal processor and methods therein that will efficiently provide a DTFT at an arbitrary frequency with limited dynamic range requirements.

BRIEF DESCRIPTION OF THE DRAWINGS

The features of the present invention that are believed to be novel are set forth with particularity in the appended claims. However, the invention together with further advantages thereof, may best be understood by reference to the accompanying drawings wherein:

DETAILED DESCRIPTION OF A PREFERRED EMBODIMENT

Figure 1:
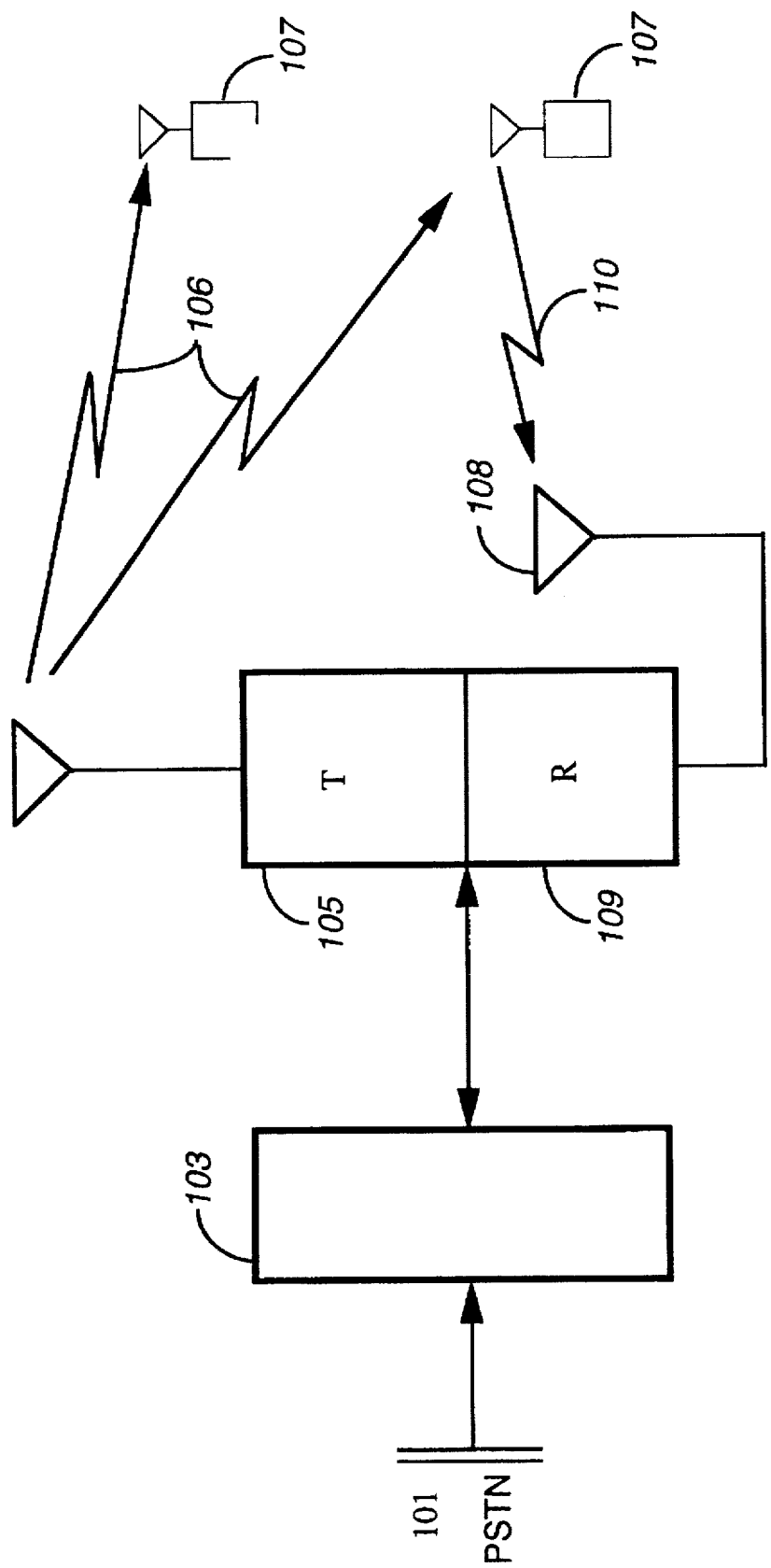
FIG. 1 is a block diagram of a selective messaging system suitable for employing an embodiment of the instant invention.

The present invention deals with a signal processor and a symbol detector used in a selective messaging receiver together with analogous methods all embodying inventive techniques of efficiently determining a discrete time Fourier transform (DTFT). More particularly a signal processor arranged and constructed to provide a DTFT corresponding to a sequence of samples, including a current, preferably, last sample, of a signal is disclosed and discussed. This signal processor includes a recursive structure, coupled to the signal and operating on the sequence of samples, for providing an output and a first previous or time delayed output. The output is proportional to a combination of the current, preferably, last sample of the signal and a first previous output weighted by a sinusoidal function, less a second previous output, where the sinusoidal function has an argument that corresponds to an arbitrary frequency. Further included is a combiner coupled to the output and the first previous output for providing a DTFT signal proportional to a DTFT evaluated at the arbitrary frequency for the sequence of samples.

The combiner preferably provides the DTFT signal as a combination of the output and the first previous output weighted in proportion to the sinusoidal function. For the sake of accuracy or required internal dynamic range the signal processor also preferably includes a signal conditioner operating to provide the sequence of samples so as to limit the magnitude of the output. This conditioner preferably phase shifts each sample of an input signal to provide the sequence of samples. This phase shifting is efficiently and effectively accomplished if each sample of the input signal is phase shifted, either positively or negatively, by $n \times 90$ degrees or $n\pi/2$ radians, where n is the index of the sample. The sinusoidal function found to be effective when the conditioner is phase shifting by a positive $\pi/2$ radians, is $2\cos(\omega+\pi/2)$ where $\omega$ is a normalized radian frequency equal to $2\pi$ times the arbitrary frequency divided by a sampling frequency for the system. A similar function with a negative $\pi/2$ factor is used for a negative shift.

This signal processor is particularly useful when the sequence of samples are complex samples and the DTFT signal is a complex value. The signal processor or any or all of the requisite elements, such as the recursive structure and the combiner are readily implemented in a digital signal processor executing software readily written by one of ordinary skill in the art. Similarly the signal processor may be implemented all or in part as one or more integrated circuits. In particular the preferred embodiment uses a Motorola DSP56166. This DSP is a 16 bit fixed point processor. This signal processor has numerous advantages over known techniques, such as the so called Goertzel method, including a factor of 2 to 4 times fewer processing steps to provide a DTFT at an arbitrary frequency as well as an inventive technique resulting in minimal dynamic range requirements for intermediate steps. Additionally there is near zero processing latency. When the first signal sample is available processing may begin and as the last signal sample arrives the DTFT is shortly available. These factors together allow the utilization of minimal capability processors or minimal capability of any processor to do, for example, the historically complex task of symbol detection.

One application of the signal processor is a symbol detector arranged and constructed to select a symbol encoded as frequency shift keyed (FSK) modulation from a sequence of samples, including a current, preferably, last sample, of a signal. The symbol detector includes a recursive structure, coupled to the signal and operating on the sequence of samples, for providing an output and a first previous output. The output is proportional to a combination of the current, preferably, last sample of the signal and a first previous output weighted by a sinusoidal function, less a second previous output, where the sinusoidal function has an argument corresponding to a frequency representative of the symbol. Also included is a combiner coupled to the output and the first previous output for providing a DTFT signal proportional to a DTFT evaluated at the frequency representative of the symbol for the sequence of samples.

The symbol detector preferably has certain structures, such as the signal conditioner, and operations that are analogous to the signal processor above described. The symbol detector as the signal processor is particularly advantageous when the sequence of samples are complex samples and the DTFT signal is a complex value. The symbol detector may be advantageously embodied in a DSP or integrated circuit form. While the symbol detector here described is adapted for FSK symbol detection the principals and analogous structure may be used to construct a phase shift keyed symbol detector, quadrature amplitude modulated (QAM) symbol detector, or others by focusing on the phase and amplitude of the DTFT rather than amplitude alone.

The symbol detector preferably includes a magnitude selector if or when one symbol from a finite set is to be selected. The magnitude selector is coupled to the combiner and operates to form a magnitude of the DTFT signal. The recursive structure and the combiner further operate to form a second and so on DTFT signal for a second and so on frequency representative of a second and so on symbol. The magnitude selector further forms a second and so on magnitude of the second, etc. DTFT signal and selects the symbol corresponding to the largest of all of the magnitudes.

Turning to the figures for a better understanding of the inventive principles within the preferred embodiment of the instant invention. FIG. 1 depicts a selective messaging system (100) in overview block diagram format. The system includes a switch, terminal, or controller (103) coupled to a message source (101), such as the Public Switched Telephone Network. The controller (103) is coupled to a selective message transmitter system or base transmitter (105) and provides messages, such as paging messages, and control/scheduling information to this transmitter system.

Each base transmitter (one depicted) uses the control scheduling information together with the messages to modulate a radio frequency carrier in accordance with a chosen modulation technique, such as preferably frequency shift keyed (FSK) modulation but equally applicable phase shift keyed (PSK) modulation or quadrature amplitude modulation (QAM), and transmits the messages from an antenna, as a modulated radio frequency carrier, over a, preferably, wireless channel (106) to the selective messaging units (107), such as paging message units (PMU) via their respective antennas. While the two PMUs are shown it is understood that a plurality of such units may exist in actual systems and that each base transmitter will be capable of delivering messages to many such PMUs.

The above description applies to so called one way selective messaging systems where messages are delivered from the base transmitters to the PMUs. In two way systems where messages may originate at the PMUs, either volitional or responsive to a message from the base transmitter, the messaging system will additionally have one or more base receivers (109). In such systems the PMUs (107) transmit a message, such as an acknowledgment (ACK) or status message from their respective antennas over their respective uplink wireless channels (110) to one or more of these base receivers (109) via their antenna (108). The receivers are coupled to the controller (103) as depicted and allow the controller (103) to provide the appropriate base transmitter with a non-acknowledgment (NACK) signal or the like under suitable circumstances.

It is noted that the selective messaging system (100) as depicted is merely an exemplary setting for the instant disclosure and serves to facilitate disclosure and in no way is intended to limit the true spirit and scope of the present invention. Actual systems may include significant additional base transmitters, PMUs, base receivers and may include an overlaying, perhaps satellite based system for maintaining a common time reference at each base transmitter for facilitating such functions as simulcasting a message from multiple base transmitters. The wireless channels (106) or uplink wireless channels (110) may be the same or different radio frequencies depending on the system design, or immediate objective. In any event the instant disclosure deals predominantly with inventive principles applicable, for example, to receivers such as found in the PMUs and preferably the base receiver (109) although these principles may find application in many fields including nearly all communications systems.

Figure 2:
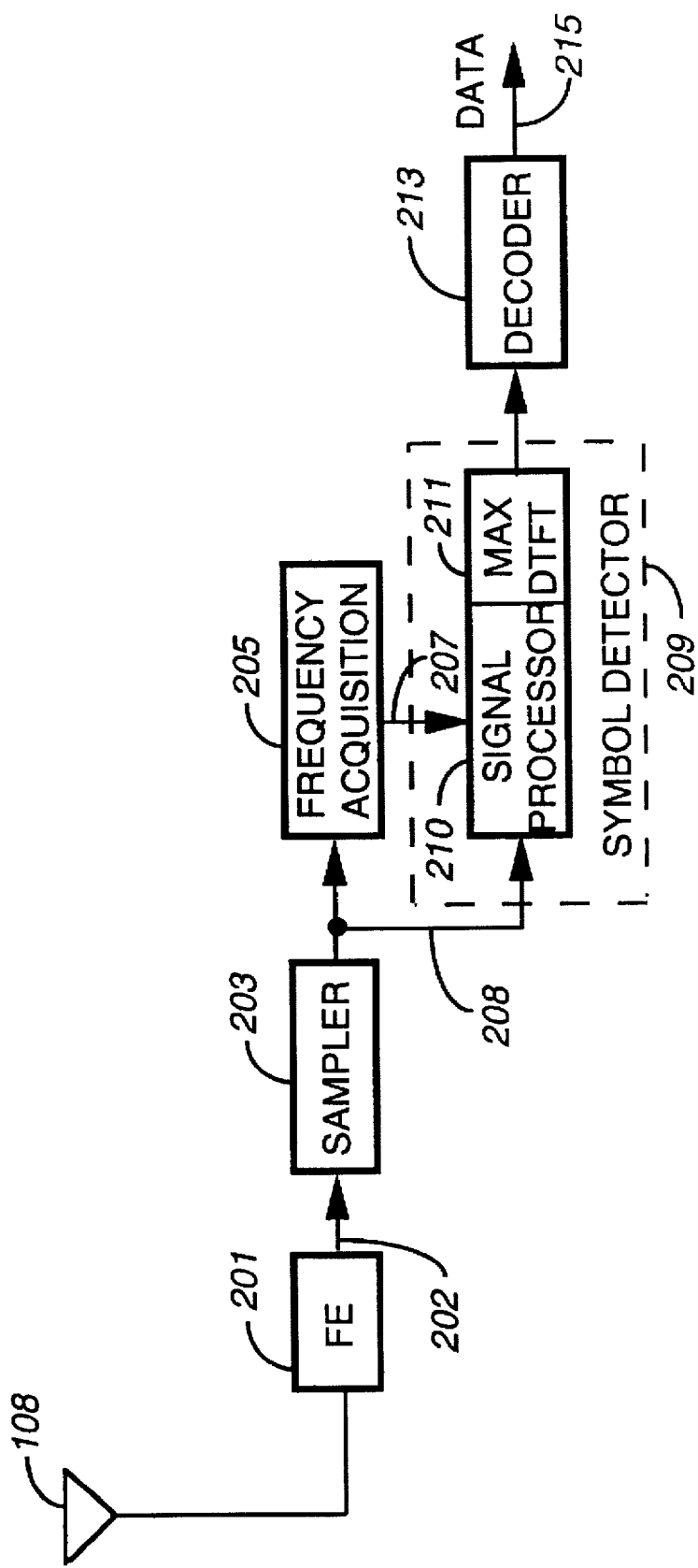
FIG. 2 is a more detailed block diagram of a receiver including a preferred embodiment of a symbol detector suitable for use in the FIG. 1 messaging system.

Thus we focus on the more detailed FIG. 2 block diagram of the receiver (109) wherein like reference numerals refer to like entities. FIG. 2 depicts the antenna (108) coupled to a radio frequency front end (201) where messages from the uplink wireless channel (110) are amplified, filtered, mixed to a low frequency baseband signal, and then demodulated to form a baseband signal, at output (202), such as depicted in exemplary form in FIG. 4 all in accordance with approaches readily evident to one of ordinary skill in the art.

Figure 4:
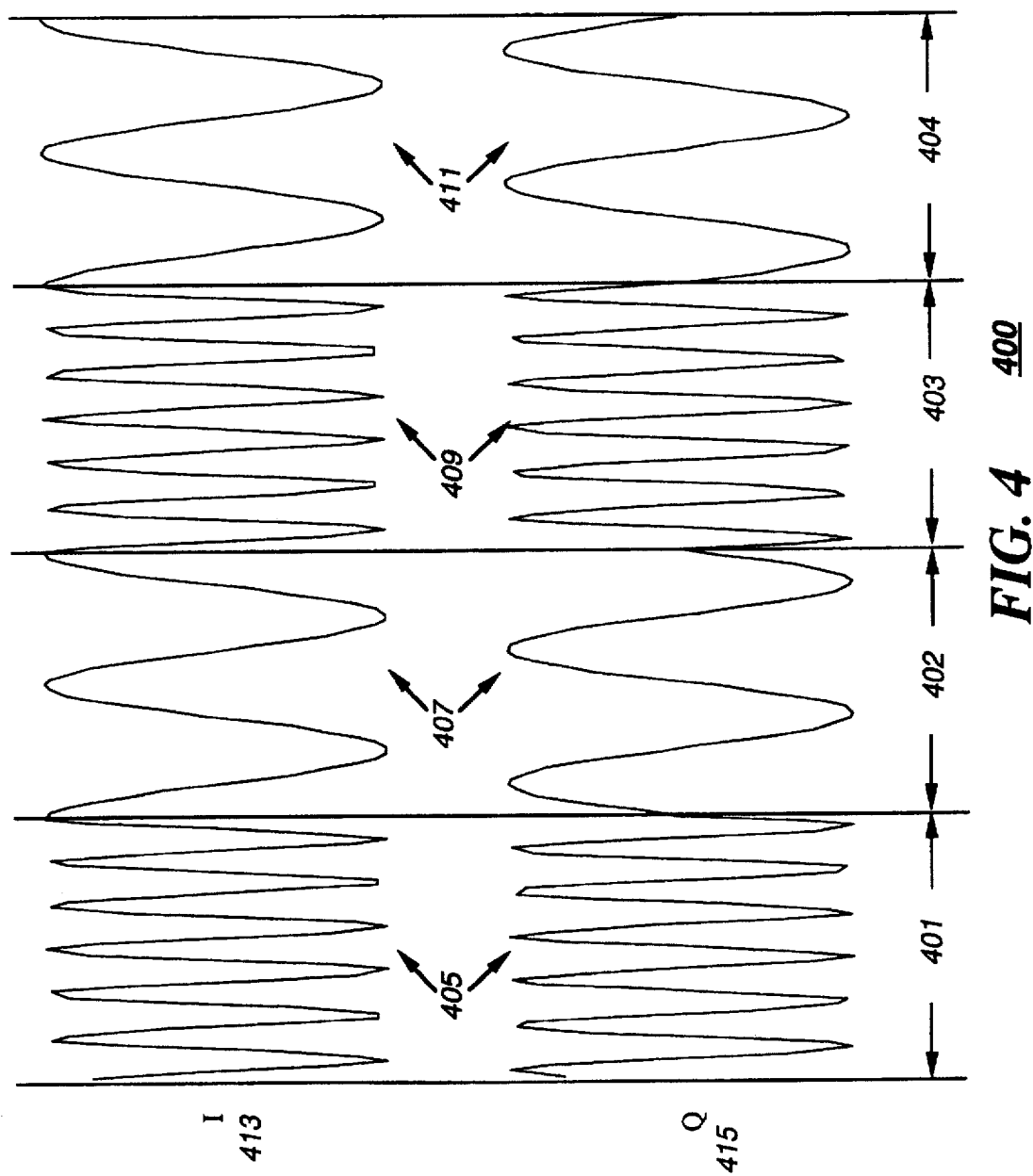
FIG. 4 is a exemplary signal diagram of an FSK baseband signal suited to understanding certain functions within FIG. 2 and FIG. 3.

The FIG. 4 signal depicts a baseband signal (400), including in phase (I) and quadrature (Q) components, that was FSK modulated with varying frequency signals representative of the four possible symbols, specifically +/−2400 Hz and +/−800 Hz, in the preferred system. Four symbol time periods (401, 402, 403, 404) are shown with time period (401) occupied by a first signal having a first frequency (405), preferably +2400 Hz, representative of a first symbol. Similarly time period (402) is occupied by a second signal having a second frequency (407), preferably +800 Hz, representative of a second symbol. During symbol time period (403) the first frequency repeats but with the opposite sign or phase for the quadrature component yielding a negative frequency signal, that is preferably −2400 Hz and during symbol time (404) the second frequency similarly repeats with an opposite phase or preferably −800 Hz. Each symbol time period depicted in FIG. 4 as in the preferred embodiment is 2.5 milliseconds (ms) in duration. In an alternative preferred embodiment the time duration is 1.25 ms. These symbol time durations correspond, respectively, to an 400 or 800 symbol per second rate and, respectively, 800 and 1600 bits per second (bps) rate as the preferred system encodes 2 bits per symbol.

The output (202) with baseband signal (400) is coupled to a sampler (203) where the baseband signal, both the in phase (I) (413) or real and quadrature (Q) (415) or imaginary components is sampled or converted to a digital signal at the sampling rate of 20,000 times per second. Each sample of the I and Q component is converted by an analog to digital converter (not specifically shown) to a 16 bit digital word. At this sampling rate 50 samples are taken during each symbol time period shown in FIG. 4, thus 50 digital words are generated, or 25 samples for each period in the alternative 1600 bps embodiment. In any event the digital words, as sampled digital data $x_i(n)$, $x_q(n)$, are coupled, at output (208), to a frequency acquisition block (205) and a symbol detector (209).

Frequency acquisition block (205) operates to acquire the actual baseband carrier frequency or frequency error, depicted as 0 Hz in representative FIG. 4. In practical systems for various reasons the actual carrier frequency of the transmitted signal and the nominal carrier frequency of the transmitter or the carrier frequency of the transmitter as expected by the receiver will differ and this difference is known as the frequency error. This frequency error in practical receivers amounts to a frequency translation of the symbol frequencies, such as depicted in FIG. 4. Hypothetically, if the frequency error was 500 Hz, the symbols depicted in FIG. 4 would be demodulated or recovered as a +2900 Hz, +1300 Hz, -1900 Hz, and -300 Hz signal in, respectively, symbol times (401, 402, 403, 404).

The frequency acquisition block (205) selects, as corresponding to a frequency error, a maximum magnitude discrete time Fourier transform (DTFT) from a multiple point, preferably 67 point, DTFT that it calculates at frequencies uniformly spread, preferably every 30 Hz for a resolution of 15 Hz, over the range of possible frequencies that may be observed. In the preferred system this acquisition phase is set to operate during a silent carrier portion of the signal and this range is +/-1000 Hz or a 1000 Hz possible frequency error. After detecting the maximum magnitude DTFT the frequency error $\Delta f$, more specifically normalized frequency error $\Delta\omega = 2\pi\Delta f/f_s$, where $f_s$ is the sampling frequency, preferably 20,000 Hz, is obtained as the frequency corresponding to the maximum magnitude DTFT. This frequency error is coupled to the symbol detector (209) at output (207) and used as further explained below in the process of symbol selection.

The symbol detector (209) includes a signal processor (210) and magnitude selector (211) that operates preferably as a comparator, as well understood, to select the largest magnitude DTFT from among all DTFTs, preferably four, provided by the signal processor (210). The magnitude selector (211) provides a series of symbols, one for each symbol time period, or digital representations thereof to a decoder (213). The decoder then decodes these symbols in accordance with whatever over the air protocol is used as is well understood in the art, into a data or binary stream at output (215). As the details of the over the air protocol and decoding are well understood in general and not further relevant to this disclosure no further space will be devoted to them.

Figure 3:
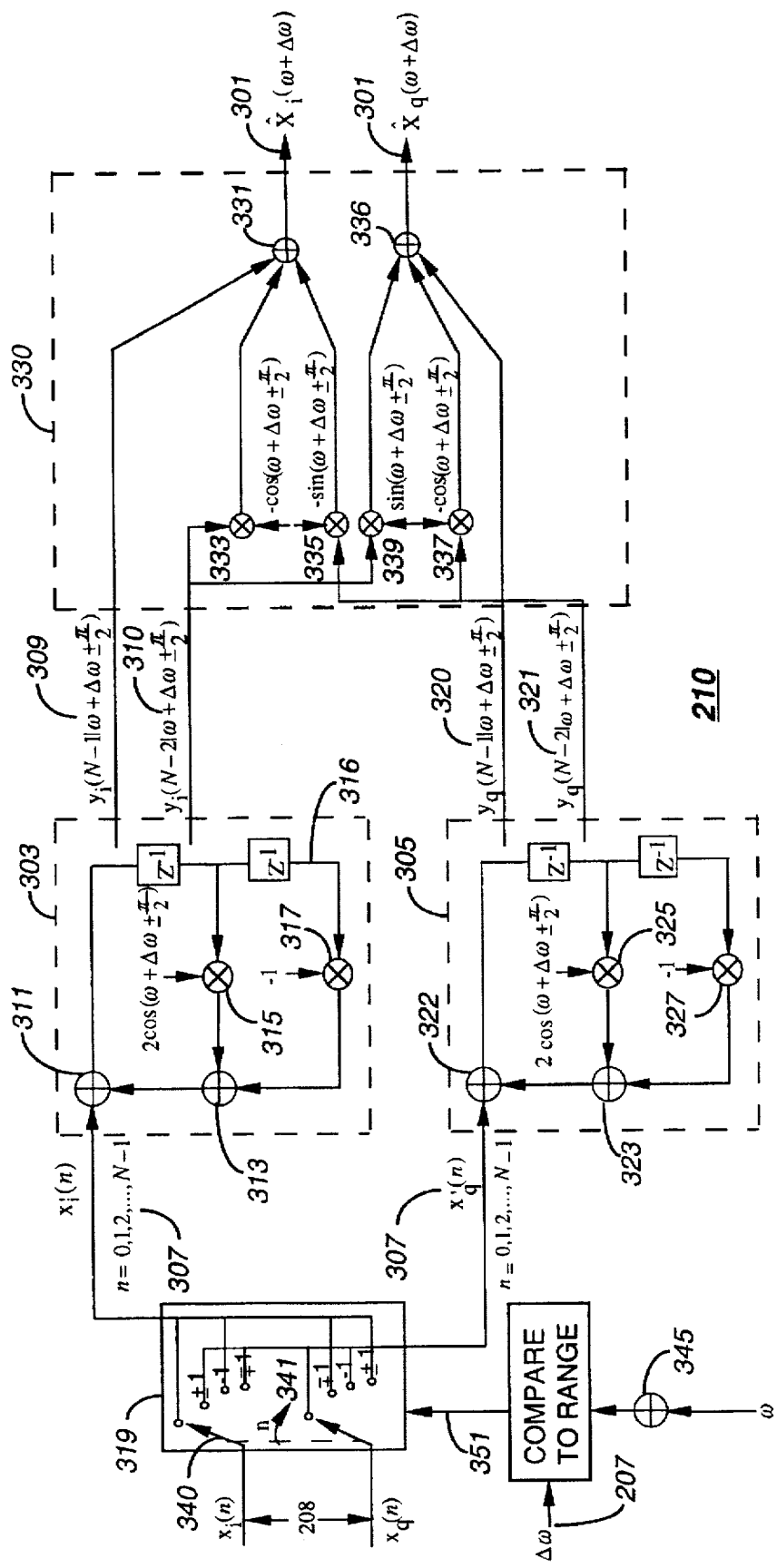
FIG. 3 is a more detailed block diagram of a preferred embodiment of a signal processor in accordance with the instant invention, the signal processor suitable for use in the FIG. 2 symbol detector.

For a more detailed understanding of the signal processor (210), the structures depicted and methods utilized in the FIG. 3 embodiments will be explained. Generally FIG. 3 depicts in composite block diagram form 3 embodiments of a signal processor arranged and constructed to provide a discrete time Fourier transform (DTFT), at output (301), corresponding to a sequence of samples, $x'_i(n)$, $x'_q(n)$ (307), n being the sample sequence index and varying from 0, 1, 2, ..., to N-1, where N, from above, is the number of samples, preferably 50 or alternatively 25 for a symbol time period, including a current, preferably, last sample, $x'_i(N-1)$, $x'_q(N-1)$, of a signal. The three embodiments are distinguished by the algebraic signs (plus (+) and minus (-)) where the preferred embodiment corresponds to the upper sign, a first alternative embodiment corresponds to the lower sign, and a second alternative embodiment substitutes 0 for the $\pi/2$ factors in the sinusoidal functions and $x_i(n) = x'_i(n)$, $x_q(n) = x'_q(n)$ all as further explained.

Before continuing with the discussion of FIG. 3, some mathematical background information will be presented. Given a complex discrete time signal defined as:

$$x(n) = x_i(n) + jx_q(n), n=0, 1, 2, \ldots, N-1,$$

and the task of computing a DTFT at an arbitrary frequency, $\omega$, where the DTFT, $X(\omega)$, is defined as:

$$X(\omega) = \sum_{n=0}^{N-1} x(n)e^{-jn\omega},$$

it can be shown that;

$$X(\omega) = e^{-j(N-1)\omega} y(N-1|\omega) - e^{-jN\omega} y(N-2|\omega),$$

where $$y(N-1|\omega) = y_i(N-1|\omega) + jy_q(N-1|\omega)$$

$$y(N-2|\omega) = y_i(N-2|\omega) + jy_q(N-2|\omega)$$

and $$y_i(n|\omega) = 2 \cos \omega y_i(n-1|\omega) - y_i(n-2|\omega) + x_i(n)$$

$$y_q(n|\omega) = 2 \cos \omega y_q(n-1|\omega) - y_q(n-2|\omega) + x_q(n)$$

The signal processor includes a recursive structure including a first recursive structure (303) and, when the signal is complex, a second recursive structure (305), that is coupled to the signal, specifically and respectively the sequence of samples $x'_i(n)$, $x'_q(n)$. The recursive structure (303) operates on the real part of the sequence of samples (307) to provide an output (309) designated $y_i(N-1|\omega + \Delta\omega \pm \pi/2)$ and a first previous output (310) designated $y_i(N-2|\omega + \Delta\omega \pm \pi/2)$. The output is proportional, preferably equivalent, to a combination, such as an algebraic sum as provided by adders (311, 313), of the current and, preferably, last sample of the signal, $x'_i(N-1)$, and the first previous output (310) weighted at multiplier (315) by a sinusoidal function, less (indicated by multiplying by -1 at multiplier (317)) a second previous output at (316).

Analogously the second recursive structure (305) operates on the imaginary part of the sequence of samples (307) to provide an output (320) designated $y_q(N-1|\omega + \Delta\omega \pm \pi/2)$ and a first previous output (321) designated $y_q(N-2|\omega + \Delta\omega \pm \pi/2)$. The output is proportional, preferably equivalent, to a combination, such as algebraic sum as provided by adders (322, 323), of the current and, preferably, last sample of the signal, $x'_q(N-1)$, and the first previous output (322) weighted at multiplier (325) by a sinusoidal function, less (indicated by multiplying by -1 at multiplier (327)) a second previous output at (326).

The sinusoidal function is, in its simplest form preferably, $2\cos(\omega)$ and has an argument corresponding to an arbitrary frequency, $\omega = 2\pi f/f_s$, where f is the arbitrary frequency and $f_s$ is the sampling frequency, preferably 20,000. This function becomes $2\cos(\omega+\pi/2)$ when a preferred form of a signal conditioner (319), later explained, is provided and enabled. The sinusoidal function as depicted and preferred is $2\cos(\omega+\Delta\omega\pm\pi/2)$ when the frequency error, $\Delta\omega$, from output (207) is nonzero and the signal conditioner is used.

Further included in the signal processor (210) is a combiner (330) that is coupled to the output (309) and the first previous output (310) and when the signal is complex the output (320) and first previous output (321) for providing, at output (301), a DTFT signal, $\hat{X}_i(\omega+\Delta\omega)+j\hat{X}_q(\omega+\Delta\omega)$. This DTFT signal may be shown to be proportional, preferrably same magnitude but phase shifted from a DTFT evaluated at the arbitrary frequency for the sequence of samples $x'_i(n)$, $x'_q(n)$ (307).

More specifically an adder (331) combines the output (309) with the first previous output (310) multiplied, at multiplier (333), by $-\cos(\omega+\Delta\omega\pm\pi/2)$, and, when the sequence of samples is complex, the first previous output (321) multiplied, at multiplier (335), by $-\sin(\omega+\Delta\omega\pm\pi/2)$ to provide $\hat{X}_i(\omega+\Delta\omega)$. Similarly, $\hat{X}_q(\omega+\Delta\omega)$ is produced by adder (336) combining the output (320) with the first previous output (321) multiplied, at multiplier (337), by $-\cos(\omega+\Delta\omega\pm\pi/2)$, and the first previous output (310) multiplied or weighted, at multiplier (339), by $+\sin(\omega+\Delta\omega\pm\pi/2)$. From the algebraic signs it is clear that the adders very often are finding a difference between two inputs as weighted.

It should be noted that while it is preferable that the recursive structures operate on all N samples before the outputs and first previous outputs are combined to yield the DTFT signal the signal processor may provide completely satisfactory results if less than all N samples are used. For example, 40 or less of the 50 samples may well be sufficient to provide a reliable estimate of which of four different symbols is present in a given symbol time period, particularly under strong signal conditions.

The signal processor may additionally include a signal conditioner (319) that operates on the sampled digital data $x_i(n)$, $x_q(n)$ from output (208) (sequential data sequence) to provide the sequence of samples (307) so as to limit the magnitude of the output (309, 320) and first previous outputs (310, 321). The signal conditioner (319), preferably, phase shifts each sample of an input signal, the sampled data signal, to provide the sequence of samples (307). Due to the recursive nature of the recursive structures (303, 305) intermediate results at the outputs such as output (309) may get quite large depending on the characteristics of the input data and more importantly the value of the argument for the sinusoidal function, specifically cosign function. In particular when this argument approaches either 0 or $\pi$ the cosign function approaches a value of $\pm1$ and by observation the outputs, such as output (309) will tend to increase in size dramatically. When the dynamic range of the recursive structure is constrained such as when using a fixed point DSP implementation this may result in significant inaccuracies in the final DTFT signal.

This phase shift may be any amount but three particular cases each having certain advantageous attributes will be considered. If the magnitude of the normalized radian frequency, $\omega$, or more specifically corrected normalized radian frequency $\omega+\Delta\omega$ is not close to 0 or $\pi$, but rather lies within a range of approx. $0.25\pi$ to $0.75\pi$ then a phase shift of zero is typically acceptable. A phase shift of zero corresponds to not having the signal conditioner (319) or disabling it by insuring that a commutating switch (340) does not operate but rather directs each data sample $x_i(n)$, $x_q(n)$ pair to the recursive structures without modification. This corresponds to the switch (340) staying in the position depicted.

It has been further discovered that a phase shift of $\pm\pi/2$ is particularly advantageous from a computational efficiency perspective. While preferably a positive $\pi/2$ shift is employed a negative $\pi/2$ shift works equally well, albeit is implemented differently as depicted by FIG. 3. In any event this phase shift amounts to multiplying each data sample by $e^{\pm jn\pi/2}$. Those of ordinary skill will recognize this is a computationally efficient transform of the data samples, reducing to a routing or algebraic sign change only.

For a positive $\pi/2$ shift and n=0, 1, 2, 3, 4, 5, . . . $x'_i(n)=x_i(0), -x_q(1), -x_i(2), x_q(3), x_i(4), -x_q(5), \ldots$ Similarly, $x'_q(n)=x_q(0), x_i(1), -x_q(2), -x_i(3), x_q(4), -x_q(5),\ldots$ For a negative $\pi/2$ shift $x'_i(n)=x_i(0), x_q(1), -x_i(2), -x_q(3), x_i(4), -x_q(5), \ldots$ and $x'_q(n)=x_q(0), -x_i(1), -x_q(2), x_i(3), x_q(4), -x_i(5), \ldots$ This corresponds to the commutating switch driven by the time index n cycling every four counts in the direction indicated by the arrow (341) where the algebraic sign for each branch of the switch is selected such that a positive $\pi/2$ shift corresponds to the upper sign, when two signs are provided, and a negative $\pi/2$ shift corresponds to the lower sign where two signs are given.

At this point it may be useful to review the operation of the FIG. 3 signal processor. Generally a signal in sampled data form, $x_i(n)+jx_q(n)$, n=0, 1, 2, 3, . . . , N-1 is coupled to the signal conditioner (319). Suppose the DTFT magnitude of a signal having an arbitrary frequency f, such as nominally 2400 Hz, is required. The signal processor (210) adds, at adder (345), this arbitrary frequency, specifically the normalized frequency, $2\pi\times2400/20000=0.24\pi$ to the frequency error $\Delta\omega$ at output(207), suppose this is 1000 Hz or normalized $0.1\pi$, for a total of 3400 Hz or $0.34\pi$.

Since this falls within the range of $0.25\pi$ to $0.75\pi$, as determined by comparator (349) the signal need not be conditioned, so the conditioner is disabled via output (351), and the signal is thus routed, sample by sample, directly to the recursive structures (303, 305). The sinusoidal functions or processing coefficients or constants, $\cos(0.34\pi)$ and $\sin(0.34\pi)$ (Note: there is no $\pi/2$ shift) are determined by calculation or lookup table to be 0.48175 and 0.87631 respectively. The recursive structures, preferably, process all N samples, here 50 samples, and after each sample including the $N^{th}$ sample, specifically $x_i(N-1)+jx_q(N-1)$, provides the outputs (309, 320) and the first previous outputs (310, 321). The combiner (330) combines as above explained these outputs and first previous outputs with one last sequence of multiplies and adds and provides the DTFT signal, $\hat{X}_i(\omega+\Delta\omega)+j\hat{X}_q(\omega+\Delta\omega)$.

This DTFT signal is proportional to a DTFT evaluated at the arbitrary frequency of 2400 Hz or after including the frequency error of 1000 Hz, 3400 Hz for this sequence of samples. The DTFT signal may be shown to be proportional in amplitude to a DTFT for this 3400 Hz signal component but may vary in phase from the true DTFT. This variation results from certain simplifications that have been taken advantage of in the combiner (330). These simplifications are applicable when the primary interest is a frequency dependent amplitude or power in a signal and the phase information is not required. In the preferred embodiment, the DTFT signal is coupled to the magnitude selector (211) where the real and imaginary components are squared and added to find the magnitude or power of the 3400 Hz signal, specifically the power corresponding to a 2400 Hz symbol.

For a symbol detector using this or a form of this signal processor and further including the magnitude detector operating to form a magnitude of the DTFT signal, the above process using the recursive structure and the combiner is repeated to form a second DTFT signal for a second frequency corresponding to a second symbol, such as −2400 Hz. The magnitude selector further forms a second magnitude of the second DTFT signal and selects the symbol corresponding to the larger of the two magnitudes. More specifically in the preferred embodiment having 4 different FSK symbols the above process is repeated for +800 Hz, −800 Hz, and −2400 Hz symbols after which a comparison of all magnitudes with one each corresponding to each possible symbol allows for one symbol to be selected, thus detected.

Figure 5:
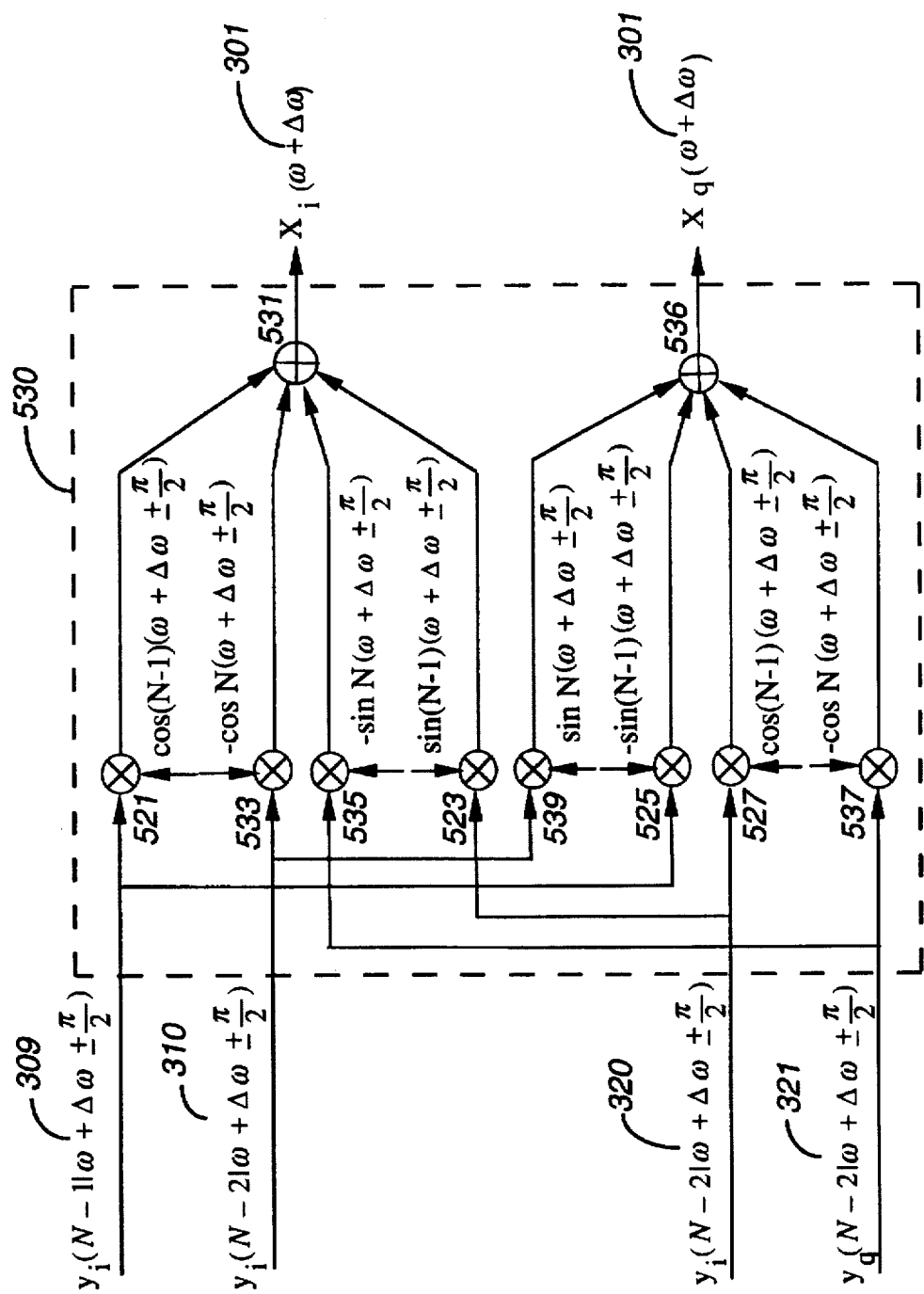
FIG. 5 is an alternative embodiment of a portion of the FIG. 3 signal processor.

Referring to FIG. 5 an alternative embodiment of a combiner (530) is depicted. This combiner is suitable for use as a substitute for the combiner (330) and has like inputs, namely the outputs (309, 320) and the first previous outputs (310, 321). The combiner (530) however provides, at output (301), a DTFT signal, $X_i(\omega+\Delta\omega)+jX_q(\omega+\Delta\omega)$, that has accurate phase and magnitude information. This combiner (530) would be required and useful in PSK or QAM systems where symbol detection requires the phase information, specifically $\tan^{-1}[X_q(\omega+\Delta\omega)/X_i(\omega+\Delta\omega)]$. QAM systems ordinarily require both phase and magnitude, specifically $[X_i(\omega+\Delta\omega)^2+X_q(\omega+\Delta\omega)^2]^{1/2}$. Due to practical difficulties, specifically extensive calculations, most practitioners will try to use the squared magnitude when feasible.

More specifically an adder (531) combines the output (309) weighted or multiplied, at multiplier (521), by $\cos(N-1)(\omega+\Delta\omega\pm\pi/2)$ with the first previous output (310) multiplied, at multiplier (533), by $-\cos N(\omega+\Delta\omega\pm\pi/2)$, and, when the sequence of samples is complex, the output (320) multiplied, at multiplier (523), by $\sin(N-1)(\omega+\Delta\omega\pm\pi/2)$, along with the first previous output (321) multiplied, at multiplier (535), by $-\sin N(\omega+\Delta\omega\pm\pi/2)$, to provide $X_i(\omega+\Delta\omega)$, the real or in phase portion of the DTFT signal. Similarly, $X_q(\omega+\Delta\omega)$, the imaginary or quadrature portion of the DTFT signal, is produced by adder (536) combining the output (320) multiplied, at multiplier (527), by $\cos(N-1)(\omega+\Delta\omega\pm\pi/2)$ with the first previous output (321) multiplied, at multiplier (537), by $-\cos N(\omega+\Delta\omega\pm\pi/2)$, and the output (309) multiplied, at multiplier (525), by $-\sin(N-1)(\omega+\Delta\omega\pm\pi/2)$ along with the first previous output (310) multiplied or weighted, at multiplier (539), by $\sin N(\omega+\Delta\omega\pm\pi/2)$.

It will be appreciated by those of ordinary skill in the art that the apparatus and methods disclosed provide various inventive techniques for signal processing such as symbol detection. The symbol detector or signal processor structure and methods discussed have improved computational efficiency by a factor of two to four times or known techniques. This has been done without compromising the accuracy of such a processor or detector and without otherwise burdening processing resources. These inventive structures and methods may be readily and advantageously employed in a messaging system, messaging receiver, or other communications devices or system so as to allow the use of lower cost fixed or programmable processors on a wide variety of modulation. Hence, the present invention, in furtherance of satisfying a long-felt need of messaging systems, readily facilitates, for example, low power consumption portable receivers by providing methods and apparatus for signal processing, such as symbol detection that are practical to implement from a physical, economic and power source perspective.

It will be apparent to those skilled in the art that the disclosed invention may be modified in numerous ways and may assume many embodiments other than the preferred forms specifically set out and described above. Accordingly, it is intended by the appended claims to cover all modifications of file invention which fall within the true spirit and scope of the invention.

What is claimed is:

1. A signal processor arranged and constructed to provide a discrete time Fourier transform (DTFT) corresponding to a sequence of samples, including a current sample, of a signal, the signal processor comprising in combination;

a recursive structure, coupled to the signal and operating on the sequence of samples, for providing an output and a first previous output, said output proportional to a combination of the current sample of the signal and the first previous output weighted by a sinusoidal function, less a second previous output, said sinusoidal function having an argument corresponding to an arbitrary frequency, and a combiner coupled to said output and said first previous output for providing a DTFT signal proportional to a DTFT evaluated at said arbitrary frequency for said sequence of samples.

2. The signal processor of claim 1 where said combiner further provides said DTFT signal as a combination of said output and said first previous output weighted in proportion to said sinusoidal function.

3. The signal processor of claim 1 further including a signal conditioner operating to provide said sequence of samples so as to limit the magnitude of said output.

4. The signal processor of claim 3 wherein said conditioner phase shifts each sample of an input signal to provide said sequence of samples.

5. The signal processor of claim 1 wherein said sinusoidal function is $2\cos\omega$, where $\omega$ is a normalized frequency equal to $2\pi$ times said arbitrary frequency divided by a sampling frequency.

6. The signal processor of claim 1 wherein said sequence of samples are complex samples and said DTFT signal is a complex value.

7. The signal processor of claim 1 wherein said recursive structure and said combiner are implemented in a digital signal processor.

8. The signal processor of claim 1 wherein said recursive structure and said combiner are implemented as an integrated circuit.

9. A symbol detector arranged and constructed to select a symbol encoded as frequency shift keyed (FSK) modulation from a sequence of samples, including a current sample, of a signal, the symbol detector comprising in combination;

a recursive structure, coupled to the signal and operating on the sequence of samples, for providing an output and a first previous output, said output proportional to a combination of the current sample of the signal and the first previous output weighted by a sinusoidal function, less a second previous output, said sinusoidal function having an argument corresponding to a frequency representative of the symbol, and a combiner coupled to said output and said first previous output for providing a DTFT signal proportional to a DTFT evaluated at said frequency representative of the symbol for said sequence of samples.

10. The symbol detector of claim 9 where said combiner further provides said DTFT signal as a combination of said output and said first previous output weighted in proportion to said sinusoidal function.

11. The symbol detector of claim 9 further including a signal conditioner operating to provide said sequence of samples so as to limit the magnitude of said output.

12. The symbol detector of claim 11 wherein said conditioner phase shifts each sample of an input signal to provide said sequence of samples.

13. The symbol detector of claim 9 wherein said sinusoidal function is $2\cos\omega$, where $\omega$ is a normalized frequency equal to $2\pi$ times said frequency corresponding to the symbol divided by a sampling frequency.

14. The symbol detector of claim 9 wherein said sequence of samples are complex samples and said DTFT signal is a complex value.

15. The symbol detector of claim 9 wherein said recursive structure and said combiner are implemented in a digital signal processor.

16. The symbol detector of claim 9 wherein said recursive structure and said combiner are implemented as an integrated circuit.

17. The symbol detector of claim 9 further including a magnitude selector coupled to said combiner and operating to form a magnitude of said DTFT signal, said recursive structure and said combiner further operating to form a second DTFT signal for a second frequency corresponding to a second symbol, said magnitude selector further forming a second magnitude of said second DTFT signal and selecting the symbol when said magnitude is larger than said second magnitude.

* * * * *